(12) United States Patent
Crownover

(10) Patent No.: US 7,590,317 B2
(45) Date of Patent: Sep. 15, 2009

(54) HIGH ENERGY FIBER OPTICS LASER DELIVERY SYSTEM WITH IMPROVED SCRAMBLING CAPABILITIES

(76) Inventor: John Crownover, 210 Commerce Blvd., Round Rock, TX (US) 78664

( * ) Notice: Subject to any disclaimer, the term of this patent is extended or adjusted under 35 U.S.C. 154(b) by 0 days.

(21) Appl. No.: 11/834,670

(22) Filed: Aug. 6, 2007

(65) Prior Publication Data

US 2008/0031571 A1 Feb. 7, 2008

Related U.S. Application Data

(63) Continuation-in-part of application No. 11/095,718, filed on Mar. 31, 2005, now Pat. No. 7,269,324.

(51) Int. Cl.
G02B 6/26 (2006.01)
(52) U.S. Cl. .............................. 385/28; 385/27; 385/31; 385/32
(58) Field of Classification Search .................... 385/28, 385/31, 137, 123, 27, 32
See application file for complete search history.

(56) References Cited

U.S. PATENT DOCUMENTS

| | | | | |
|---|---|---|---|---|
| 4,877,305 A | * | 10/1989 | Ricciardelli | ................. 385/123 |
| 5,130,512 A | * | 7/1992 | Coyle et al. | ............. 219/121.68 |
| 5,159,481 A | * | 10/1992 | Maeda | ........................ 398/202 |
| 5,408,545 A | * | 4/1995 | Lee et al. | ........................ 385/11 |
| 6,266,456 B1 | * | 7/2001 | Lee et al. | ........................ 385/11 |
| 6,295,161 B1 | * | 9/2001 | Bazzocchi | ............. 359/341.33 |
| 2002/0018287 A1 | * | 2/2002 | Zellmer et al. | ............ 359/341.1 |
| 2004/0071398 A1 | * | 4/2004 | Pierce et al. | ................... 385/28 |
| 2005/0265678 A1 | * | 12/2005 | Manyam et al. | .............. 385/127 |

* cited by examiner

Primary Examiner—Ellen Kim

(57) ABSTRACT

The methods and apparatus of the present invention provide advantages for remote laser delivery systems that conduct high levels of light energy through a fiber optic cable to a target surface. Helical fiber optic mode scramblers in accordance with the present invention are an integral portion of a fiber optic cable having a spiral curvature predetermined to advantageously influence the intermodal dispersion characteristics of the fiber optic cable. Various embodiments of helical fiber optic mode scramblers in accordance with the present invention enable delivery of light energy at rates that can exceed continuous deliver of 30 Joules per millimeter squared of cross sectional area of a fiber optics cable. Particular embodiments of a fiber optic mode scrambler in accordance with the present invention include a support structure and a cylindrical sleeve that provide limited longitudinal flexibility maximizing the range of positions in which the fiber optics cable can be dynamically arranged.

17 Claims, 3 Drawing Sheets

SECTION D-D

Section E-E

HIGH ENERGY FIBER OPTICS LASER DELIVERY SYSTEM WITH IMPROVED SCRAMBLING CAPABILITIES

CROSS-REFERENCE TO RELATED APPLICATIONS

This is a continuation-in-part of my prior application Ser. No. 11/095,718, filed on Mar. 31, 2005 now U.S. Pat. No. 7,269,324, which is incorporated by reference.

FIELD OF THE INVENTION

The present invention relates to optical transmission systems; in particular, the invention relates to an enhanced fiber optic mode scrambler suitable for remote laser delivery systems; more particularity, the invention relates to high energy fiber optics laser delivery systems with a helical fiber optic mode scrambler that enables more than 30 Joules of light energy per each millimeter squared of fiber optic cable cross section.

High energy fiber optics laser delivery systems commonly employed for instruments and tools typically direct the intense light energy to a target surface to produce visual effects, heating or prolonged light exposure. UV photolithography, welding, engraving, marking, sensors and analytical instruments are among the uses for high energy laser delivery systems. In addition, the medical sciences are advanced by the ability to direct high levels of light energy to perform precise cutting, burning, and ablation of tissue in surgery, as well as, photodynamic non-ablative therapy such as hair removal, topical laser peel.

Design considerations involved in designing high energy laser delivery systems differ substantially from fiber optic communication systems. In communication systems, light signal modulation and detection rather than energy delivery is the primary concern. Providing for energy transmission capacity while maximizing the service life of a fiber optic cable are important concerns in designing high energy fiber optics laser delivery systems. The current trends demand increasingly greater levels of energy output; however, the availability of fiber optic cables with increasingly larger diameters to deliver increasingly higher levels of light energy is severely limited. Serious technology and market hurdles, including the increasingly lack of flexibility longitudinally and relatively low volume of overall sales tends to result in very few manufacturers and premium pricing of fiber optic cable in the upper range of diameter. Methods are needed to increase the energy delivery capability of fiber optics cables to maximize energy delivery levels as well as cost reduce existing systems use smaller diameter, much more readily available, smaller diameter, fiber optics cable.

BRIEF DESCRIPTION OF THE DRAWINGS

The invention may best be understood by referring to the following description and accompanying drawings that are used to illustrate embodiments of the invention. In the drawings:

FIGS. 3A, 3B and 3C show an embodiment of a helical fiber optic mode scrambler of the present invention.

DETAILED DESCRIPTION OF THE INVENTION

Figure 1:
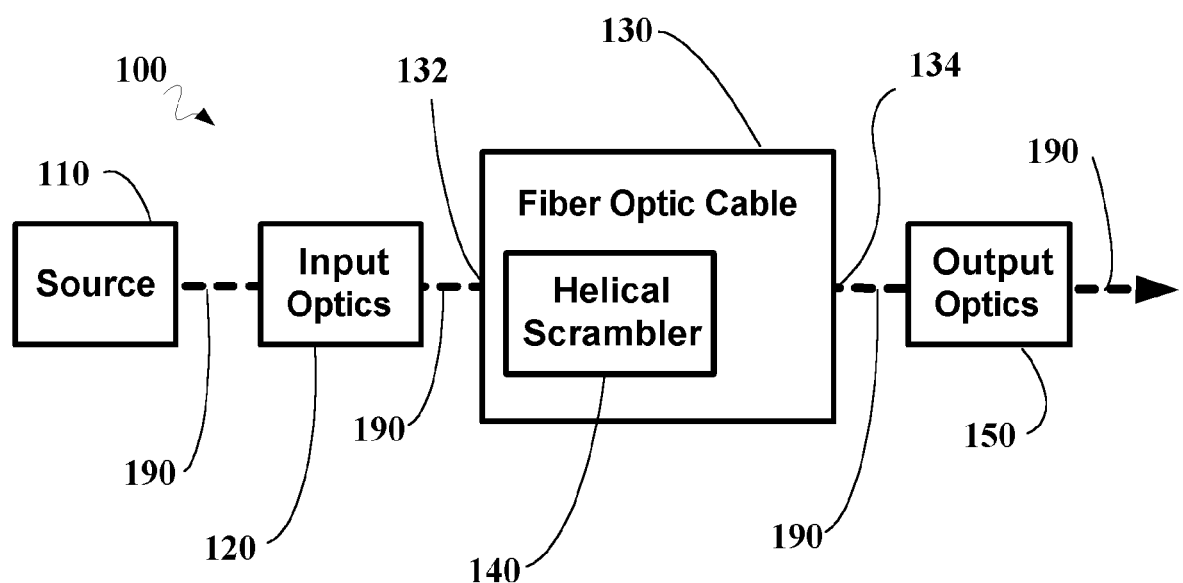
FIG. 1 is a block diagram of an embodiment of a high energy laser delivery systems of the present invention.

In the following description, numerous specific details are set forth to provide a thorough understanding of the invention. However, it is understood that the invention may be practiced without these specific details. In other instances, structures and techniques have not been shown in detail in order not to obscure the invention.

The present invention may be employed to obtain one or more advantages for high energy laser delivery systems such as, for example increase the energy carrying capacity of a fiber optic cable, increase the useful life of a fiber optic cable, cost reduction by providing for smaller diameter fiber optic scramblers to do the function of larger diameter fiber optic cable in existing systems, provide for more efficient use of the fiber optics cable, and increase the overall flexibility and positionability of a fiber optics cable.

The energy delivery capacity of high energy laser delivery systems based on methods of the present invention can be significantly improved, and in some cases, increased more than 60%. Empirical data shows that a 1500 µm diameter fiber can deliver 47 Joules of laser energy (3 millisecond pulses at 10 hertz, in the wavelengths of 750-1080 nm), without scrambling, but an increase to 53 Joules quickly results in catastrophic fiber failures. Photons launched into a fiber optic cable, typically, fill relatively few modes resulting in irregular photon density in the planes traverse to the direction the photons travel. Planer S-bend type scramblers implemented with opposing half-circle bends formed on a plane to approximate the shape of an "S" provide some increase in energy delivery capacity, but only a few more additional Joules. The planer S-bend type scramblers provide some increase in energy delivery capacity but fail to achieve optimal energy delivery capacity due to a lack of uniform photon distribution across the entire cross section of a fiber optics cable and furthermore such scramblers tend to make inefficient use of the length of the fiber optics cable.

Redistribution of the light energy, in accordance with the methods of the present invention, to fill additional available modes results in a significantly more uniform energy distribution enabling substantially greater levels of energy delivery. For example, empirical data shows that embodiments based on methods of the present invention can enable energy transfer, through a fiber optic cable that is greater than three feet in length, at rates that exceed a continuous delivery of 30 Joules per millimeter squared ($mm^2$) of cross sectional area of a fiber optics cable. A laser delivery system, based on methods of the present invention, employing a 1500 µm diameter fiber optics cable to transmit laser energy in the wavelengths of 750-1080 nm has been found to have exceptionally long-term, reliable operation at delivery levels of 66 Joules (300 millisecond pulses) and provided transmission of 80 Joules (3 millisecond pulses at 10 hertz) under test conditions.

FIG. 1 is a block diagram of an exemplary high energy laser delivery system 100 in accordance with the present invention. High energy laser delivery system 100 is suitable for a wide range of applications in which light energy 190 is transmitted through a fiber optic cable 130 and directed to a target surface to provide, for example, visual effects, heating or prolonged light exposure. High energy laser delivery system 100 is comprised of a light source 110, input coupling optic 120, a fiber optic cable 130 and output coupling optic 150. Light source 110 in the exemplary embodiment is an optically pumped alexandrite laser. Optionally, the light source 110 may generate pulse modulated laser energy. The frequency of the photon energy generated by suitable alterative light sources 110 may be in the visible spectrum or the invisible such as, for example, ultra-violet, or infrared radiation.

In the various disclosed exemplary embodiments, fiber optic cables 130, 530, and 630 have a pure silica core. The core is surrounded by a hard polymer cladding, which in turn is surrounded by a Tefzel™ jacket. Fiber optic cables 130, 530, and 630 are each essentially a waveguide adapted to conduct light energy. Suitable fiber optic cables 130, 530, and 630 are comprised of solid or hollow elongated cores composed of light-transmissive material such as glass or plastic that is surrounded by a cladding of light-transmissive material having an index of refraction that is lower than the index of refraction of the inner core.

In the exemplary embodiment shown in FIG. 1, fiber optic cable 130 is at least three feet in length with two opposing ends 132, 134, the proximal end 132 and the distal end 134. During operation, the input coupling optics 120 accepts light energy 190 generated by light source 110 and launches light energy 190 into the proximal end 132 of the fiber optic cable 110. Suitable input coupling optics 120 may include one or more lenses to direct the photons 190 launched into the fiber optic cable 130. During operation, the output coupling optics 150 receives light energy 190 emanating from the distal end 134 of the fiber optic cable 130 and directs light energy 190 to a target surface. Optionally, the output coupling optics 150 may include one or more lens (not shown) to collimate and/or focus the received light energy 190. There will be some loss of light energy 190 as it propagates through system 100.

High energy laser delivery system 100 is further comprised of a helical fiber optic mode scrambler 140, which is formed from an integral portion of fiber optic cable 130. Preferably the helical fiber optic mode scrambler 140 is located a near the proximal end 132 of the fiber optic cable 130, such as, no more than three feet away from the proximal end 132. Depending on the launch angle into the fiber optic cable 130, there can be hundreds, even thousands, of different ray paths or modes by which light energy propagates down the core. Helical fiber optic mode scrambler 140 determines the angles of reflection between propagating photons and the core/cladding interface to influence the intermodal dispersion characteristics of the fiber optic cable.

Optionally, embodiments of high energy laser delivery system 100 may be adapted for use as a hand held tool to precisely direct light energy to a target surface, for example, to produce visual effects, heating or prolonged light exposure. The fiber optics cable 130 may optionally be adapted to allow a person holding the fiber optics cable 130, near the distal end 134, to manipulate the fiber optic cable 130 and thereby dynamically determine the relative position of the distal end 134 in relationship to the proximal end 132 as well as determine the direction of the light energy 129 emanating from the distal end 134.

Figure 2A:
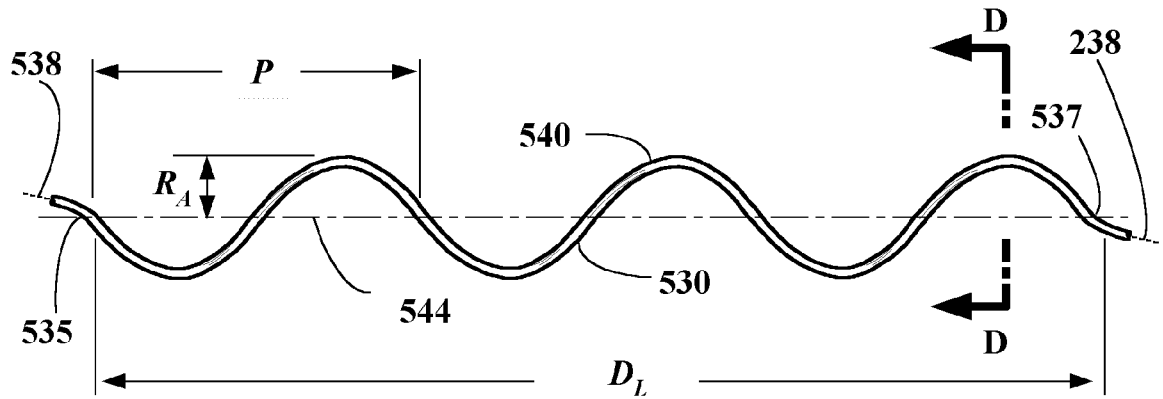
FIGS. 2A, and 2B depict an embodiment of a helical fiber optic mode scrambler of the present invention.
Figure 2B:
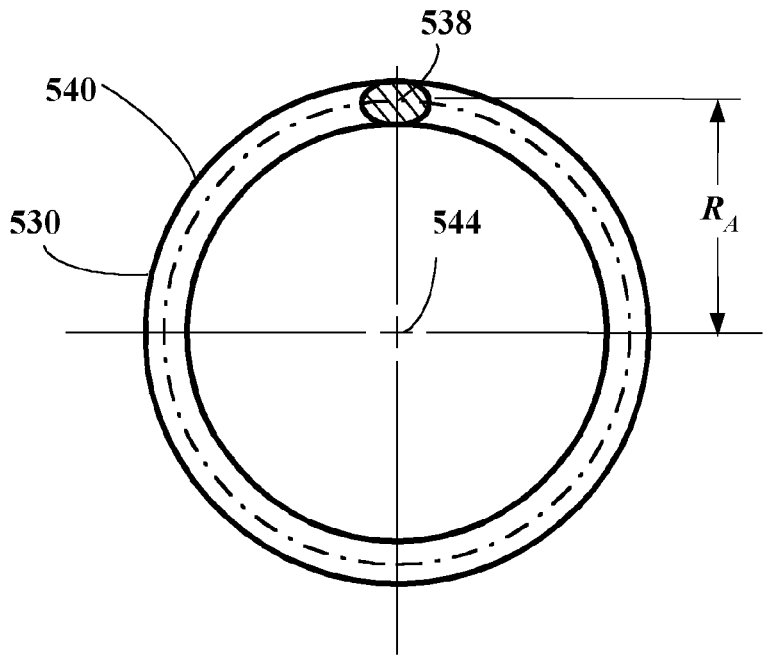

FIGS. 2A and 2B show a helical fiber optic mode scrambler 540 of the present invention suitable for the helical fiber optic mode scrambler 140 of FIG. 1. FIG. 2B depicts a cross sectional view of FIG. 2A. Helical fiber optic mode scrambler 540 advantageously influences the intermodal dispersion characteristics of fiber optic cable 530, thereby enabling increased energy delivery capacity through fiber optic cable 530. In general, helical fiber optic mode scrambler 540 can enable energy delivery levels in excess of 30 Joules per millimeter squared ($mm^2$) of cross sectional fiber optic cable 530, at rates from 1 millisecond pulse per one second to continuous transmission, through a fiber optic cable 530 that has a length greater than three feet.

Helical fiber optic mode scrambler 540 is formed from an integral portion of fiber optic cable 530 located between a first location 535 and a second location 537 on fiber optics cable 530. The fiber optic cable 530 is cylindrical and elongated with a longitudinal axis 538 (See FIG. 2B) that has a spiral curvature with at least one turn (360°) around a longitudinal axis 544 (See FIG. 2A) of the spiral curvature. The radial distance $R_A$ (See FIG. 2B) between the longitudinal axis 544 of the spiral curvature and the axis 538 of the fiber optics cable 530 is in the range of 0.5 to 10.0 times the diameter of the fiber optics cable 530. The pitch P, which is the linear distance between consecutive turns, of the spiral curvature is in the range of 50 to 150 times the diameter of the fiber optics cable 530. Helical fiber optic mode scrambler 540 need only consist of only 5% to 10% of the of a fiber optic cable 530 that is greater than 3 feet. The effectiveness of the helical fiber optic mode scrambler 540, defined by the ratio of the length of the fiber optics cable 530 between the first location 535 and the second location 537 on the fiber optics cable 530 divided by the distance $D_L$ (SEE FIG. 2A) spanned between the first location 535 and the second location 537 on the fiber optics cable 530, is at least 1.00005.

Figure 3B:
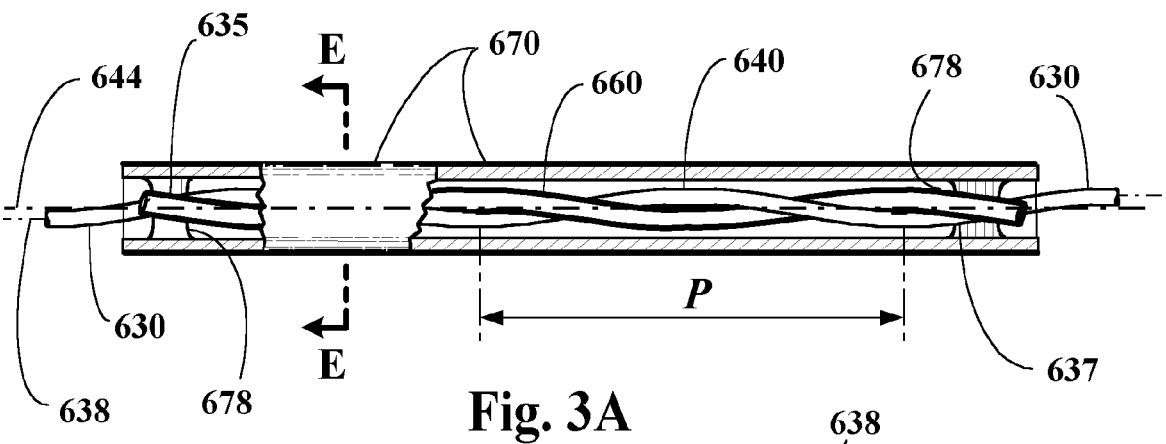
Figure 3B:
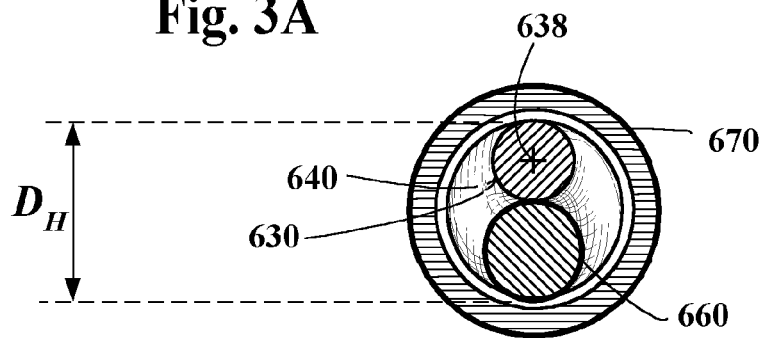
Figure 3C:
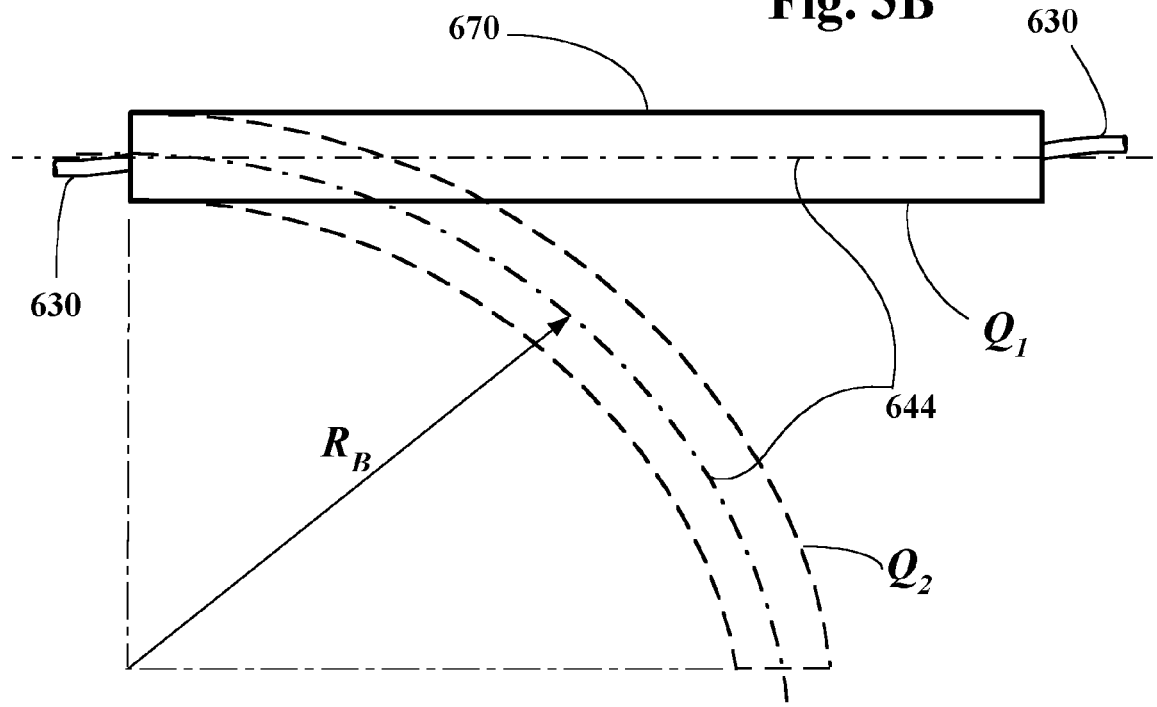

FIGS. 3A, 3B and 3C depict an embodiment of a helical fiber optic mode scrambler 640 that is in accordance with the present invention and suitable for implementing the helical fiber optic mode scrambler shown in FIGS. 2A and 2B. FIG. 3B depicts cross section view of FIG. 3A.

Helical fiber optic mode scrambler 640 comprises a portion 640 of fiber optics cable 630 located between a first location 635 and a second location 637, spaced apart, on fiber optics cable 630. Scrambler portion 640 is coiled tightly with an elongated support 660 where each has a spiral curvature around a longitudinal axis 644 to form a double helix. Fiber optics cable 630 has a diameter of 1500 μm. Helical fiber optic mode scrambler 640 has two and one-half (2½) turns and a pitch P (distance between consecutive turns) that is about 4 inches.

A flexible sleeve 670 encompasses the helical fiber optic mode scrambler 640 and elongated support 660. Helical fiber optic mode scrambler 640 and elongated support 660 are rigidly bonded together with epoxy 678 at the spaced locations 635, 637 on fiber optics cable 630. Whereas the rest of the helical fiber optic mode scrambler 640 is not bonded to the flexible sleeve 670 or the elongated support 660.

Elongated support 660 is comprised primarily of Teflon™ and is fairly flexible in the longitudinal direction. Elongated support 660 resist compression radially when coiled tightly with the fiber optics cable 630. The helical fiber optic mode scrambler 640 tends to exert substantial spring-like torque urging the helical fiber optic mode scrambler 640 to a have more linear curvature.

Flexible sleeve 670 is comprised of polypropylene and is generally cylindrical with about ⅜ outer diameter and about 1/16 inch thick walls. Suitable materials for flexible sleeve 670 are capable of opposing the rotational torque generated by the scrambler portion 640, resist collapsing of the cylindrical structure, are capable of some limited bending in the longitudinal direction, and exerts a spring like force that tends resist bending of the longitudinal axis.

One aspect of the present invention is the capability of helical fiber optic mode scrambler 640 to bend longitudinally in tandem with elongated support 660 and flexible sleeve 670 when acted upon by an externally applied force (not shown). FIG. 3C shows two possible optional curvatures for helical fiber optic mode scrambler 640. When in optional position $Q_1$ the longitudinal axis 644 of helical fiber optic mode scrambler 640 is straight and when in optional position $Q_2$ the longitudinal axis 644 of helical fiber optic mode scrambler 640 is bent with to have a radius $R_B$. $R_B$, in the described embodiment, can be as small as 20 times the outer diameter $D_H$ (See FIG. 3B) of the double helix 624. The full range of possible curvatures for helical fiber optic mode scrambler 640 is predetermined to provide the desired influence on the intermodal dispersion of the fiber optic cable 630 during operation. The capability for the helical fiber optic mode scrambler 640 to bend longitudinally has the advantage, in some embodiments, to maximize the arrangement options of fiber optic cable 630. This aspect of the present invention can be particularly advantageous in some hand held tools.

Another aspect of the present invention enables highly efficient use of the fiber optic cable 130, 530, 630 to accomplish the scrambling capabilities. The methods of the present invention may be utilized to maximize the distance spanned by a fiber optic cable 130, 530, 630 or alternatively to reduce the length of fiber optic cable 130, 530, 630 spanning a fixed distance to minimize the losses that inherently occur in transmission through a fiber optics cable 630.

I claim:

1. A high energy fiber optics laser delivery system with scrambling capabilities, comprising:
   a fiber optics cable with a proximal end and a distal end, wherein the length of fiber optics cable between said proximal end and said distal end is at least 3 feet, and wherein the fiber optics cable is capable, during operation, of receiving light energy from said proximal end and delivering, to said distal end, power of more than 30 Joules of said light energy per each $mm^2$ of cross sectional area of said fiber optics cable, at a rate of least one millisecond pulse per second; and
   a scrambler portion formed integral with said fiber optics cable and located between a first and said second spaced locations on said fiber optics cable; wherein the scrambler portion has a three-dimensional spiral curvature predetermined to influence the intermodal dispersion characteristics of the fiber optics cable to enable reliable transmission of said light energy through said fiber optic cable, wherein the effectiveness of the scrambler portion, defined by the ratio of the length of the fiber optics cable between said first location and said second location on the fiber optics cable divided by the distance spanned between said first location and said second location on said fiber optics cable, is at least 1.00005.

2. The energy fiber optics laser delivery system of claim 1, wherein said scrambler portion consist of 5% to 10% of said fiber optics cable, wherein said first spaced location is within 3 feet of said proximal end of said fiber optics cable, wherein the pitch of said three-dimensional spiral curvature is 50 to 150 times the diameter of said fiber optics cable, and wherein the radius of said three-dimensional spiral curvature, measured from the axis of said spiral curvature to the axis of said fiber optics cable is between 0.5 to 10.0 times the diameter of said fiber optics cable.

3. The high energy fiber optics laser delivery system of claim 2, wherein said scrambler portion tends to exert a spring-like rotational toque tending to urge said scrambler portion to have a more linear curvature; and
   further comprising an elongated support having a diameter that is in the range of one-half to ten times that diameter of said fiber optics cable, wherein said elongated support and said scrambler portion are tightly coiled to where said elongated support has a three-dimensional spiral curvature with an axis substantially coincident with the axis of said three-dimensional spiral curvature of said scrambler portion; and
   further comprising a sleeve, wherein said sleeve tends to oppose the spring-like rotational torque exerted by said scrambler portion.

4. The high energy fiber optics laser delivery system of claim 3, wherein the position of said distal end of said fiber optics cable is selectively positionable in relationship to said proximal end within a predetermined range of relative position options;
   further comprising an output coupling optics, coupled to said distal end of said fiber optics cable, capable of directing said light energy emanating from the distal end of the fiber optics cable to a selectable target surface, and wherein said selectable target surface is determined by said selection of one of said relative position options for said distal end in relationship to said proximal end to provide visual effects, heating, or prolonged light exposure of the selectable target surface; and
   wherein said distal end of said fiber optics cable is adapted to being hand held and said selectable target surface is determinable dynamically, during operation, by the selection of one of said relative position options for said distal end in relationship to said proximal end.

5. The high energy fiber optics laser delivery system of claim 3, wherein said scrambler portion, said elongated support, and said sleeve are capable of selectively bending longitudinally in tandem to where the axis of said three-dimensional spiral curvature of said scrambler portion is bent to have a radius as small as 20 times the outside diameter of said three-dimensional spiral curvature of said scrambler portion.

6. The high energy fiber optics laser delivery system of claim 1, further comprising a light source for selectively generating, during operation, at least 30 Joules of light energy per each $mm^2$ of cross sectional area of said fiber optics cable; and
   further comprising input coupling optics coupled to the proximal end of fiber optics cable to receive said light energy generated by said light source during operation and then to launch light energy into said proximal end of said fiber optic cable.

7. The high energy fiber optics laser delivery system of claim 6, wherein said fiber optics cable is capable of delivering at least 53 Joules of light energy at a rate of at least 3 millisecond pulses to said distal end; and
   wherein said three-dimensional spiral curvature enables reliable transmission of said light energy through said fiber optic cable; and
   further comprising a light source for selectively generating, during operation, at least 53 Joules of light energy; and
   and further comprising an input coupling optics coupled to the proximal end of fiber optics cable to receive light energy generated by said light source and then to launch said light energy into said fiber optic cable during operation.

8. A high energy fiber optics laser delivery system with scrambling capabilities, comprising:
   a fiber optics cable with a proximal end and a distal end, capable, during operation, of receiving light energy from said proximal end and delivering, to said distal end, power of more than 30 Joules of said light energy per each $mm^2$ of cross sectional area of said fiber optics cable, at a rate of least one millisecond pulse per second, wherein the length of fiber optics cable between said proximal end and a distal end is at least 3 feet, wherein the fiber optics cable is capable of receiving light energy from the proximal end and is capable of a delivering said light energy to the distal end, and wherein said fiber optic cable is capable of having the position of said a distal end of said fiber optics cable is selectively positionable in relationship to said proximal end within a limited range of relative position options;

a scrambler portion formed integral with said fiber optics cable and located between a first and said second spaced locations on said fiber optics cable, wherein said integral scrambler portion has a three-dimensional spiral curvature predetermined to influence the intermodal dispersion characteristics of said fiber optics cable; and an output coupling optics coupled to said distal end of the fiber optics cable capable of directing light energy emanating from said distal end of the fiber optics cable to a selectable target surface, wherein, said fiber optic cable is capable, during operation, of having said selectable target surface selectively determined by said selection of one of said relative position options for said distal end in relationship to said proximal end;

wherein said scrambler portion consist of 5% to 10% of said fiber optics cable, wherein said first spaced location is within 3 feet of said proximal end of said fiber optics cable, and wherein the pitch of said three-dimensional spiral curvature is 50 to 150 times the diameter of said fiber optics cable, and wherein the radius of said three-dimensional spiral curvature, measured from the axis of said spiral curvature to the axis of said fiber optics cable is between 0.5 to 10.0 times the diameter of said fiber optics cable.

9. The high energy fiber optics laser delivery system of claim 8, wherein said scrambler portion tends to exert a spring-like rotational toque tending to urge said scrambler portion to a more linear curvature; and further comprising an elongated support that resist compression in the radial direction, wherein said scrambler portion is coiled around said first support; and further comprising a flexible sleeve capable of opposing said spring-like rotational torque exerted by said scrambler portion.

10. The high energy fiber optics laser delivery system of claim 9, wherein said scrambler portion, said first support, and said second support are capable of selectively bending longitudinally in tandem to where the axis of said three-dimensional spiral curvature of said scrambler portion is bent to have a radius as small as 20 times the diameter of said three-dimensional spiral curvature of said scrambler portion.

11. A high energy fiber optics laser delivery system with scrambling capabilities, comprising:

a fiber optics cable with a proximal end and a distal end, wherein the length of fiber optics cable between said proximal end and a distal end is at least 3 feet, wherein the fiber optics cable is capable of receiving light energy from the proximal end and is capable of a delivering said light energy to the distal end; and a scrambler portion formed integral with said fiber optics cable consisting of 5% to 10% of said fiber optics cable, wherein said scrambler portion is located between a first and said second spaced locations on said fiber optics cable, and wherein said first spaced location is within 3 feet of said proximal end of said fiber optics cable;

wherein said scrambler portion has a three-dimensional spiral curvature predetermined to influence the intermodal dispersion characteristics of the fiber optics cable, wherein the pitch of said three-dimensional spiral curvature is 50 to 150 times the diameter of said fiber optics cable, and wherein the radius of said three-dimensional spiral curvature, measured radially from the axis of said spiral curvature to the axis of said fiber optics cable, is between 0.5 to 10.0 times the diameter of said fiber optics cable.

12. The high energy fiber optics laser delivery system of claim 11, wherein said scrambler portion tends to exert a spring-like rotational toque tending to urge said scrambler portion to have a more linear curvature;

further comprising a first support, wherein said scrambler portion coils around said first support; and further comprising a second support, wherein said second support tends to oppose the spring-like rotational torque exerted by said scrambler portion.

13. The high energy fiber optics laser delivery system of claim 12, wherein said first support has a diameter that is one-half to ten times the diameter said fiber optics cable and formed to have three-dimensional spiral curvature with an axis substantially coincident with the axis of said three-dimensional spiral curvature of said scrambler portion.

14. The high energy fiber optics laser delivery system of claim 12, wherein said second support is a cylindrical sleeve substantially encompassing said scrambler portion and said first support.

15. The high energy fiber optics laser delivery system of claim 12, wherein said scrambler portion, said first support and said second support are capable of selectively bending longitudinally in tandem to where the axis of said three-dimensional spiral curvature of said scrambler portion is bent to have a radius as small as 20 times the diameter of said three-dimensional spiral curvature of said scrambler portion.

16. The high energy fiber optics laser delivery system of claim 14, wherein said first and second spaced locations on said fiber optics cable are each rigidly affixed to corresponding locations on said first support and said second support, and wherein said scrambler portion of said fiber optics cable is not rigidly bonded to said first support and is not rigidly bonded to said second support.

17. The high energy fiber optics laser delivery system of claim 16, further comprising a light source for selectively generating, during operation; and further comprising an input coupling optics coupled to the proximal end of said fiber optics cable to receive light energy selectively generated by said light source, during operation, and then launch light energy into said fiber optic cable.

* * * * *